(12) United States Patent
Rapidel et al.

(10) Patent No.: US 6,424,411 B1
(45) Date of Patent: Jul. 23, 2002

(54) OPTICAL INSTALLATION AND PROCESS FOR DETERMINING THE RELATIVE POSITIONS OF AT LEAST TWO OBJECTS IN SPACE

(75) Inventors: Jean-Loup Rapidel, Bueil; Jean-Thierry Lapreste, Clermond-Ferrand; Gérard Rives, Chanonat; Michel Dhome, Pont Du Chateau; Jean-Marc Lavest, Clermont-Ferrand, all of (FR)

(73) Assignee: Compagnie Europeenne d'Equipements de Garage, Morangis (FR)

( * ) Notice: Subject to any disclaimer, the term of this patent is extended or adjusted under 35 U.S.C. 154(b) by 0 days.

(21) Appl. No.: 09/443,437

(22) Filed: Nov. 19, 1999

(30) Foreign Application Priority Data

Nov. 20, 1998 (FR) ............................................. 98 14661

(51) Int. Cl.$^7$ ............................. G01B 11/26; G01B 5/24
(52) U.S. Cl. ............................. 356/139.09; 33/203.18; 33/288
(58) Field of Search ............................. 33/203.18, 288; 356/139.09

(56) References Cited

U.S. PATENT DOCUMENTS

| 4,639,878 A | 1/1987 | Day et al. |
| 4,928,175 A | 5/1990 | Haggrén |
| 5,148,591 A | 9/1992 | Pryor |
| 5,532,816 A | * 7/1996 | Spann et al. ........... 356/139.09 |
| 6,075,589 A | * 6/2000 | Muller et al. .......... 356/139.09 |

FOREIGN PATENT DOCUMENTS

| DE | 4041723 A1 | 6/1992 |

* cited by examiner

Primary Examiner—Stephen C. Buczinski
(74) Attorney, Agent, or Firm—Wenderoth, Lind & Ponack, L.L.P.

(57) ABSTRACT

An optical installation for determining the relative positions of at least two objects, such as vehicle wheels, includes two optical systems for determining the position of an object in space, each with respect to its observation frame. An optical reference system includes a target visible from the other optical system in the absence of the objects. The other optical system includes a device for analyzing an image of the target and a device for positioning the target with respect to its observation frame, so as to deduce therefrom the position of the observation frame of the other optical system with respect to the observation frame of the of the optical reference system, on the basis of the positions of the target with respect to the observation frame and of the target with respect to the observation frame of the optical reference system.

12 Claims, 3 Drawing Sheets

OPTICAL INSTALLATION AND PROCESS FOR DETERMINING THE RELATIVE POSITIONS OF AT LEAST TWO OBJECTS IN SPACE

BACKGROUND OF THE INVENTION

1. Field of the Invention

The present invention relates to an optical installation for determining the relative positions of at least two objects in space. The optical installation comprises at least two optical systems each associated with an observation frame, the optical systems each being adapted for the determination of the position of an object in space with respect to its observation frame, on the basis of an image of the object which is captured by the optical system.

It furthermore relates to a process for determining the relative positions of at least two objects in space. The process implements at least two optical systems each associated with an observation frame, the optical systems each being adapted for the determination of the position of an object in space with respect to its observation frame, on the basis of an image of the object which is captured by the optical system.

2 Description of the Related Art

For checking the geometry of an automotive vehicle, it is necessary to ascertain the relative positions of the wheels of the vehicle. This information makes it possible to check and optionally correct the parallelism of the wheels and in particular the geometry of the vehicle.

To this end, various installations and processes are known which it make possible, with the aid of several optical systems each observing a wheel of the vehicle, to determine the relative positions of these wheels. Such devices and processes are described for example in the documents WO-94/05969 and U.S. Pat. No. 5,675,515.

In these installations, the optical systems are formed by independent cameras, or a single camera associated with sets of lenses defining separate optical paths for one and the same incident beam. The optical systems allow simultaneous observation of the wheels of the vehicle and, on the basis of the images of the wheels, make it possible to determine their relative positions.

To this end, it is necessary for the various optical systems, to be in known relative positions, otherwise it is impossible to correlate the information obtained from the images of each wheel. To guarantee fixed relative positions of the optical systems with respect to one another, the devices described in these documents provide for rigid mechanical structures on which the optical systems are immobilized.

The presence of rigid mechanical structures of this kind renders the installation bulky. Moreover, the latter is fragile since the deformation, for example following unintentional knock, of the rigid mechanical structures leads to errors in measuring the relative positions of the wheels of the vehicle.

SUMMARY OF THE INVENTION

The object of the invention is to propose an optical installation and process for determining the relative positions, in space, of at least two objects, especially wheels of vehicles, the installation having reduced bulk, being easy to implement and having reduced sensitivity to the harsh conditions encountered in a garage.

To this end, the subject of the invention is an optical installation for determining the relative positions of at least two objects in space, of the aforesaid type, characterized in that the optical systems are movable with respect to one another, in that an optical system, constituting an optical reference system, comprises a set of reference points, of known geometrical configuration. The set of reference points is immobilized in a known position with respect to the observation frame of the optical reference system, and is visible from each optical system in the absence of objects, in that each optical system comprises means for analyzing an image of the set of reference points and means for positioning the set of reference points with respect to its observation frame, and in that it comprises means for deducing the position of the observation frame of each optical system with respect to the observation frame of the optical reference system, on the basis of the position of the set of reference points with respect to each observation frame, and of known position of the set of reference points with respect to the observation frame of the optical reference system.

According to particular embodiments, the optical installation comprises one or more of the following characteristics.

Each optical reference system comprises a video camera supported by a leg and connected to a same central information processing unit. The set of reference points comprises a group of coplanar discrete visible marks as well as at least one non-coplanar visible mark. The installation comprises pads, each adapted so as to be secured to an object in a known position, and in that each optical system comprises means for determining the position of a pad in space with respect to its observation frame and means for deducing the position of the object with respect to its observation frame from the determined position of the pad with respect to its observation frame and from the known position of the pad with respect to the object.

The installation comprises four optical systems which are intended to be disposed substantially at the vertices of a quadrilateral for the determination of the relative positions of four objects in space, the objects being disposed inside the zone delimited by the quadrilateral. The installation can comprise two optical installations as defined above, the set of reference points of a first optical reference system being visible from the second optical reference system in the absence of objects. The second optical reference system comprises means for analyzing an image of the set of reference points of the first optical reference system and means for positioning the set of reference points with respect to its observation frame. It also comprises means for deducing the position of the observation frame of the second optical reference system with respect of the observation frame of the first optical reference system, on the basis of the position of the set of reference points of the first optical reference system with respect to the observation frame of the second optical reference system, and of the known position of the set of reference points of the first optical reference system with respect to the observation frame of the first optical reference system. It further comprises means for deducing the relative positions of the observation frames of each optical system.

The subject of the invention is moreover an optical process for determining the relative positions of at least two objects in space, of the aforesaid type, characterized in that the optical systems are movable with respect to one another, in that the optical system, constituting an optical reference system is furnished with a set of reference points, of known geometrical configuration. The set of reference points is immobilized in a known position with respect to the observation frame of the optical reference system, and is visible from each optical system in the absence of objects, in that each optical system analyzes an image of the set of reference points and determines positioning of the set of reference points with respect to its observation frame. The position of the observation frame of each optical system with respect to the observation frame of the optical reference system is deduced on the basis of the positioning of the set of reference points with respect to the observation frame, and the known position of the set of reference points with respect to the observation frame of the optical reference system.

BRIEF DESCRIPTION OF THE DRAWINGS

The invention will be better understood on reading the following description given merely by way of example and while referring to the drawings in which.

DETAILED DESCRIPTION OF THE INVENTION

Figure 1:
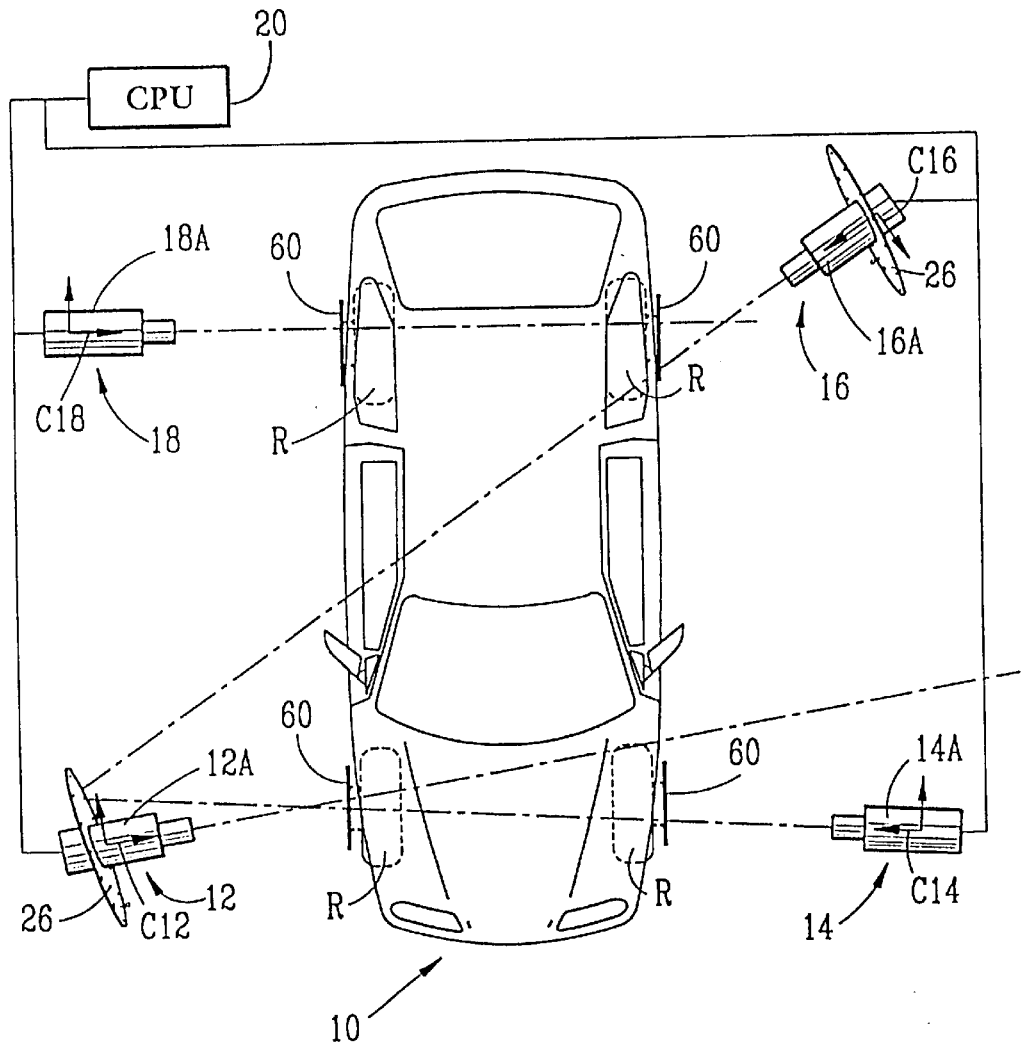
FIG. 1 is a top view of an optical installation according to the invention adapted for determining relative positions of the four wheels of an automotive vehicle.

The installation represented in FIG. 1 is intended for determining, in an optical manner, the relative positions fo the four wheels R of an automotive vehicle designated by the reference 10.

The installation comprises four optical systems 12, 14, 16, 18 each associated with a wheel R of the vehicle. They each comprise a CCD video camera labeled 12A, 14A,16A, 18A. These four cameras are connected to a central information processing unit (CPU) 20 formed for example by a computer adapted for processing the images received.

The optical systems 12, 14, 16, 18 are movable with respect to one another about the vehicle 10. For correct operation of the installation, the optical systems are disposed fixedly at the four vertices of a quadrilateral, in particular a rectangle surrounding the vehicle.

Figure 2A:
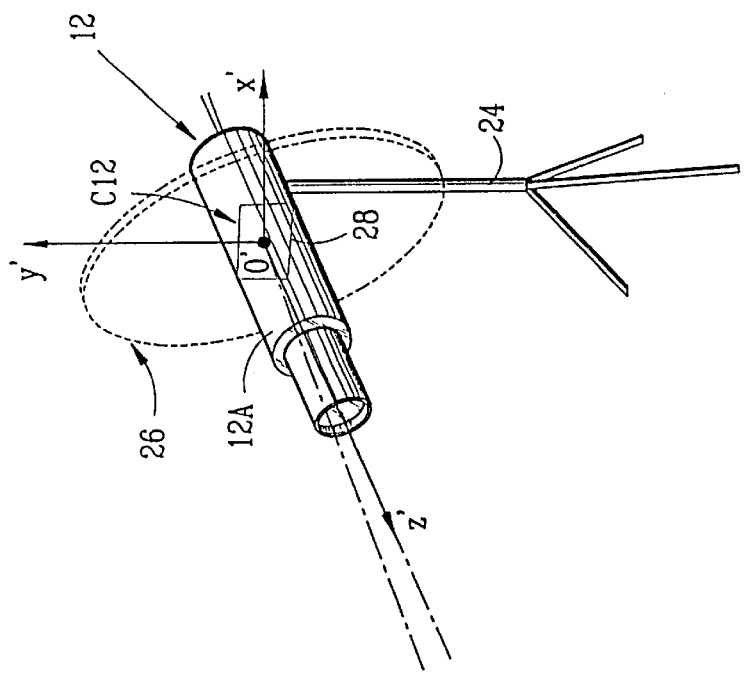
FIGS. 2A and 2B are perspective views of one and the same optical reference system of the device of FIG. 1 and represent respectively, an observation frame individual to an image gathering member and a visible frame defined by a set of reference points.
Figure 2B:
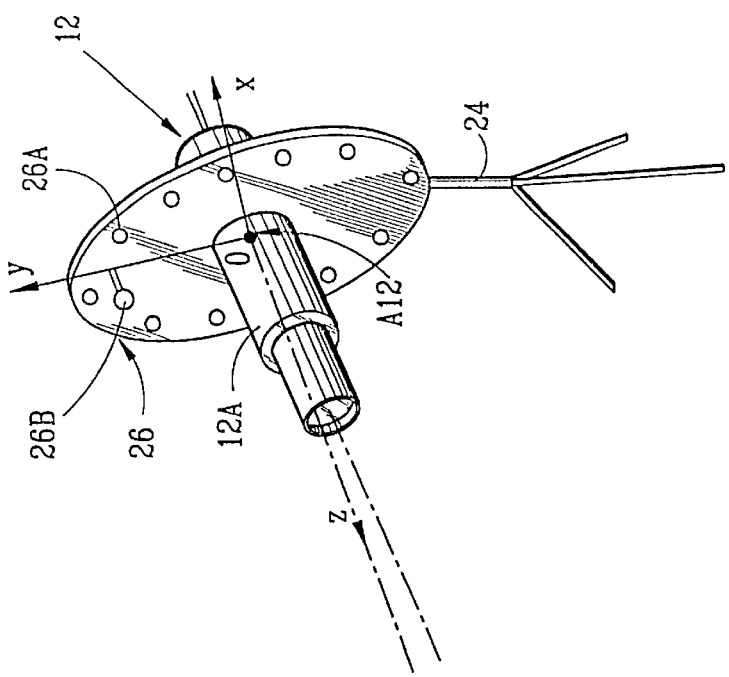

The optical system 12 is represented in perspective in FIGS. 2A and 2B. The video camera 12A is supported by a tripod 24 adapted so as to stand on the ground. Furthermore, the camera 12A is secured to a target 26 defining a visible frame (O,xyz) labeled A12, and visible in FIG. 2A. The target 26 is immobilized by mechanical means with respect to the structure of the camera and in particular with respect to its observation frame (0',x'y'z') labeled C12. The observation frame C12 is linked to the image gathering member 28 of the camera 12A and in particular to its CCD sensor.

The optical system 12 constitutes an optical reference system. Likewise, the optical system 16, disposed in the opposite corner with respect to the vehicle in the configuration of FIG. 1, also constitutes an optical reference system and has an identical structure to that of the optical system 12.

On the other hand, the optical systems 14 and 18 are targetless and comprise a simple video camera 14A, 18A carried by a support tripod.

As a variant, the optical systems 14 and 18 have the same structure as the optical systems 12 and 16. In this case, the four optical systems are optical reference systems, thus allowing redundant measurements and hence greater reliability of the result of these measurements.

As represented in FIG. 2A, the target 26 is formed, for example, by a disk with a center O and at the periphery of which are distributed twelve coplanar points 26A. Furthermore, the target 26 comprises a thirteenth point 26B disposed in front of the principal plane of the disk containing the twelve points 26A.

This point angularly tags the disk 26 and makes it possible to define two orthogonal axes, Ox and Oy in the plane of the target. The axis Oy advantageously passes square with the point 26B.

The target 26 exhibits a principal axis of symmetry defined by the twelve coplanar points distributed regularly at the periphery of the disk. The principal axis of symmetry forms an axis Oz perpendicular to the axes Ox, Oy.

The axes Oz, Oy, Ox and the point 0 define the visible frame A12.

Thus, the target 26 constitutes a set of reference points, of known geometrical configuration defining the visible frame A12. The latter is immobilized in a determinable position with respect to the observation frame C12 of the camera.

As represented in FIG. 2B, the observation frame C12 has as its center, labeled 0', the center of the CCD sensor of the camera 12A. The observation frame is defined by a trihedral (O'x', Oy', Oz'), where Oz' is the optical axis of the camera, O'x' is an axis parallel to the horizontal rows of pixels of the CCD sensor and O'y' is an axis parallel to the vertical columns of pixels of the CCD sensor.

The geometrical configuration of the set of reference points of the target 26 is stored in the information processing unit 20.

The information processing unit 20 comprises means for implementing algorithms for determining the position of an object in space. In particular, it is adapted for determining the position of an object bearing a set of reference points disposed in a known geometrical configuration, this configuration being previously stored in the unit 20. This position is determined from the image of this object acquired by a camera connected to the information processing unit. The position of the object in space is calculated with respect to the observation frame C12 of the camera. The algorithm implemented is of any suitable type and for example of the type described in application WO 94/05969.

With a view towards implementing such algorithms, it is appropriate to use cameras which have previously been calibrated so as to compensate for errors resulting from the imperfections of the camera and of the sensor which it contains.

To this end, the intrinsic characteristics (observation frame, focal length, size of the image elements or pixels, radial distortion, tangential distortion) of each camera are determined together with its extrinsic characteristics (rotation and translation matrices which, when applied to the object observed, form an image which is strictly identical to the image observed by the camera ridded with its distortions). The corrections which must be made to the images produced so as to determine a correct position of an object in space are thus determined by known methods.

For the implementation of the process according to the invention, it is necessary to ascertain, for each optical reference system 12', 16, the relative positions of the observation frame of the camera, and the visible frame defined by the target. Indeed, it is extremely tricky, or even impossible, when immobilizing the target on the camera, to fix the latter so that the two frames C12 and A12 are exactly merged.

Figure 3:
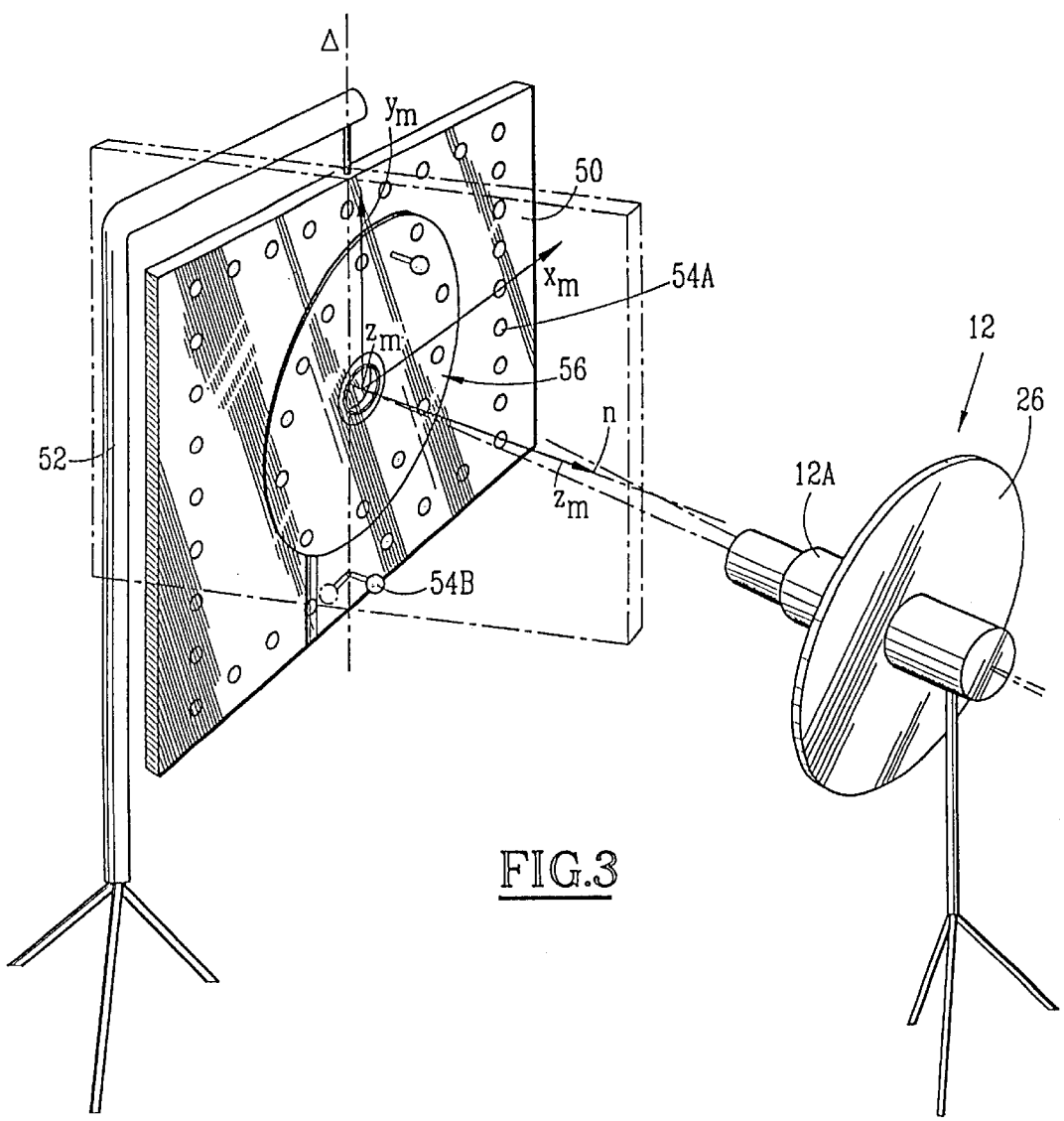
FIG. 3 is a perspective view of an optical reference system disposed facing a mirror which is movable between two positions, so as to determine the position of the observation frame of the optical system with respect to its visible frame.

Illustrated in FIG. 3 is the process implemented for determining the relative position of the two frames C12 and A12 individual to the optical system 12. The process used for the optical system 16 is analogous.

In accordance with this process, the optical system 12 is disposed opposite a reflecting face of a plane mirror 50. This mirror is suspended from a bracket 52. The means of suspension are adapted for free rotational motion of the mirror about a vertical axis Δ.

On its reflecting face, the mirror 50 comprises a set of reference marks 54A consisting of black disks distributed, according to a known geometrical figure such as a square, at the periphery of the mirror. An additional reference mark 54B is disposed in front of the reflecting face of the mirror 50. The geometrical configuration of the reference marks 54A and 54B is known and stored in the information processing unit 20.

In FIG. 3, the normal to the mirror 50 is labeled n. This normal is perpendicular to the mirror and passes through the center of the figure delimited by the set of marks 54A and 54B. The mirror comprises its own frame $(O_m, x_m y_m z_m)$ whose center $O_m$ is the center of the figure delimited by the marks 54A. The axis $O_m Z_m$ lies along the normal n. The axes $O_m X_m$ and $O_m y_m$ lie perpendicularly to one another in the plane of mirror 50. Advantageously the axis $O_m y_m$ lies parallel to the axis Δ.

The target 26, bearing the set of reference points 26A and 26B, is reflected on the reflecting surface of the mirror 50 and forms on the mirror an image of the target labeled 56.

Thus, the camera 12A gathers, in the observation frame C12, an image of the reflecting face of the mirror 50 comprising on the one hand the set of reference marks 54A and 54B, and on the other hand the reflected image 56 of the target borne by the optical system.

As a camera 12A is connected to the information processing unit 20, the latter determines, from the stored algorithm, the position of the mirror 50 with respect to the observation frame C12 on the basis image acquired of the set of reference marks 54A and 54B borne by the mirror.

Likewise, the information processing unit 20 determines, by implementing the stored algorithm, the position of the virtual image of the target 26 with respect to the observation frame C12 of the camera. More particularly, the information processing unit 20 determines the position of a virtual visible frame (O", x"y"z") associated with the virtual image of the target 26 with respect to the observation frame (O', x'y'z') of the camera.

The virtual visible frame (O", x"y"z") is the virtual image of the visible frame (O, xyz) obtained by reflection in the mirror 50.

On the basis of the relative positions, of the observation frame (O', x'y'z') with respect to the frame of the mirror $(O_m, x_m y_m z_m)$ on the other hand, and of the virtual visible frame (O", x"y"z") with respect to the observation frame (O', x'y'z') on the other hand, the central information processing unit 20 determines the position of the observation frame (O', x'y'z') of the camera, with respect to the visible frame (O, xyz) defined by the target 26.

To this end, the information processing unit 20 proceeds in the following manner.

Through the algorithm implemented by the unit 20, the position of the virtual image, corresponding to the image 56 of the target and obtained by reflection in the mirror 50, is determined by analyzing the image gathered by the camera 12A.

This positioning makes it possible to determine a matrix $M_{o-v}$ for transferring between the virtual frame (O", x"y"z") linked to the virtual image and the observation frame (O', x'y'z'). This change of frame is expressed in matrix form in the following manner:

$$\begin{bmatrix} x'' \\ y'' \\ z'' \\ 1 \end{bmatrix} = M_{o-v} \begin{bmatrix} x' \\ y' \\ z' \\ 1 \end{bmatrix} \text{ where } M_{o-v} = \begin{bmatrix} R & T \\ 0 & 1 \end{bmatrix}; M_{o-v} \text{ being a } 4 \times 4 \text{ matrix.}$$

where

R is a 3×3 rotation sub-matrix;

T is a 1×1 translation sub-matrix;

(x"y"z") are the coordinates of a point M in the virtual visible frame (O", x"y"z"); and (x'y'z') are the coordinates of the point M in the observation frame (O', x'y'z').

Through an algorithm of the same type, the information processing unit 20 determines the position of the mirror 50, and in particular of its associated frame $(O_m, x_m y_m z_m)$ in the observation frame (O', x'y'z') linked to the camera. To do this, the information processing unit 20 analyzes the image of the mirror 50 as gathered by the camera and determines the position of the mirror 50 on the basis of the analysis of the position of the reference marks 54A and 54B appearing in the image.

A matrix $M_m$ for transferring between the observation frame (O', x'y'z') and the frame $(O_m, x_m y_m z_m)$ of the mirror is thus determined. The coordinates of one and the same point M in the two frames are therefore related as follows:

$$\begin{bmatrix} x_m \\ y_m \\ z_m \\ 1 \end{bmatrix} = M_m \begin{bmatrix} x' \\ y' \\ z' \\ 1 \end{bmatrix} \text{ where } M_m = \begin{bmatrix} R_m & T_m \\ 0 & 1 \end{bmatrix}$$

with $R_m$ is a 3×3 rotation sub-matrix;

$T_m$ a 1×3 translation sub-matrix; and $(x_m, y_m, z_m)$ are the coordinates of the point M in the frame of the mirror $(O_m, x_m y_m z_m)$ from which is deduced:

$$\begin{bmatrix} x' \\ y' \\ z' \\ 1 \end{bmatrix} = M_m^{-1} \begin{bmatrix} x_m \\ y_m \\ z_m \\ 1 \end{bmatrix}$$

where $M_m^-$ is the inverse of the matrix $M_m$.

Thus, it is possible to express, in the virtual visible frame (O", x"y"z") the coordinates of a point M as a function of its coordinates in the frame of the mirror $(O_m, x_m y_m z_m)$ through the following matrix relation:

$$\begin{bmatrix} x'' \\ y'' \\ z'' \\ 1 \end{bmatrix} = M'_{o-v'} \begin{bmatrix} x_m \\ y_m \\ z_m \\ 1 \end{bmatrix} \text{ with } M'_{o-v} = M_{o-v} * M_m^{-1}$$

where $*$ is the matrix product.

In order to determine the position of a real point M in the frame of the mirror $(O_m, x_m y_m z_m)$, use is made of the property according to which the virtual image of a point with coordinates (x,y,z) in a given frame, when the mirror lies along the plane Ox, Oy, has coordinates (x, y,-z).

Thus the coordinates (x",y",z") of the virtual image in the virtual visible frame of the point M with coordinates (x,y,z) in the visible frame are obtained by applying the following diagonal matrix $S_z$:

$$\begin{bmatrix} 1 & 0 & 0 & 0 \\ 0 & 1 & 0 & 0 \\ 0 & 0 & -1 & 0 \\ 0 & 0 & 0 & 1 \end{bmatrix}$$

The coordinates (xyz) of a point M, expressed in the visible frame (O, xyz), can be expressed as a function of the coordinates $(x_m y_m z_m)$ of this same point in the frame of the mirror $(O_m, x_m y_m z_m)$ in the form:

$$\begin{bmatrix} x \\ y \\ z \\ 1 \end{bmatrix} = M'_{o-v} * S_Z \begin{bmatrix} x_m \\ y_m \\ z_m \\ 1 \end{bmatrix}$$

By writing, $M_o' = M_{o-v}' * S_z$, $M_o''$ is therefore the matrix for transferring from the frame of the mirror $(O_m, x_m y_m z_m)$ to the visible frame (O, xyz).

In order to determine the coordinates of a point in the visible frame (O, xyz) from the coordinates (x'y'z') of the same point in the observation frame (O, x'y'z'), of the following matrix relation $$\begin{bmatrix} x \\ y \\ z \\ 1 \end{bmatrix} = M_o \begin{bmatrix} x' \\ y' \\ z' \\ 1 \end{bmatrix} \text{ with } M_o = M_{o-v} * M_m^{-1} * S_z * M_m.$$

is deduced from relations (1) and (2).

Thus, it is appreciated that the central information processing unit 20 can, by implementing the calculation set forth above, determine the position of the observation frame C12 associated with the camera with respect to the visible frame A12 associated with the target 26 secured to this camera.

Moreover, according to the invention, there is a provision to position the set of optical systems, and in particular the optical reference systems with respect to the vertical, at the site where the vehicle is checked.

To this end, an image of the mirror 50 in a first position of the latter, represented by bold lines in FIG. 3, is determined. The mirror is then moved to a second position represented by chain-dotted lines in FIG. 3. The movement is effected about the axis Δ suspension of the mirror. This axis Δ corresponds to the vertical at the site of utilization of the installation.

On the basis of the stored algorithm, the central information processing unit 20 determines, for the two positions of the mirror, the coordinates of the planes in which the mirror lies. The straight line Δ corresponds to the intersection of the two planes thus determined. The central information processing unit 20 thus determines the relative position of the optical reference system with respect to a family of horizontal planes which are of paramount importance to the particular case of the geometry of vehicles.

Figure 4:
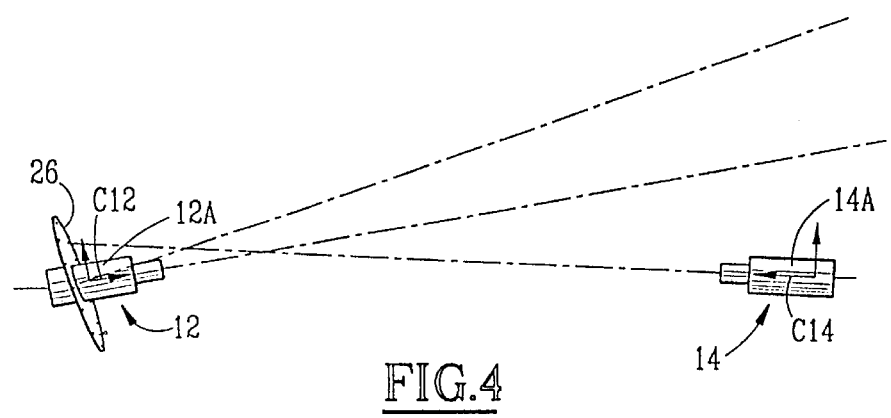
FIG. 4 is a schematic view illustrating the determination, according to the invention, of the relative positions of the observation frames of two facing optical systems.

Represented schematically in FIG. 4 are the optical systems 12 and 14 facing one another, in the absence of the automotive vehicle 10. The optical systems 12 and 14 are disposed, as in FIG. 1, facing one another with a sufficient space to allow the vehicle 10 to pass through.

In order to determine for example the relative position of the front wheels of the vehicle, it is appropriate to determine the relative positions of the observation frames associated with the optical systems 12 and 14. The latter are designated in FIGS. 1 and 4 by C12 and C14.

The matrix for transferring between the observation frame C12 and the visible frame A12 is known, since it is determined according to the method set forth earlier.

In order to determine the relative positions of the observation frames C12 and C14, the optical system 14 constructs, under the control of the information processing unit 20, an image of the target 26. This image is processed by the information processing unit 20.

The information processing unit 20, knowing the geometrical configuration of the set of reference points of the target 26 determines, by implementing the stored algorithm, the relative position of the target 26 with respect to the observation frame C14 of the observing optical system. From this, it thus deduces the position of the visible frame A12 defined by the target 26 with respect to the observation frame C14.

Knowing the matrix for transferring from the observation frame C12 to the visible frame A12 and vice-versa, the central information processing unit 20 determines the relative positions of the observation frames C12 and C14.

Thus, the central information processing unit 20 determines the relative position between the observation frames associated with the two facing optical systems 12 and 14.

Likewise, the optical system 16 disposed on the opposite side from the optical system 12 with respect to the location of the vehicle 10 observes the target 26 borne by the optical system 12 in the absence of the vehicle. In an analogous manner, the information processing unit 20 determines the position of the observation frame, labeled C16, associated with the optical system 16 with respect to the observation frame C12 of the optical reference system.

Finally, since the optical system 16 is also furnished with a target which is immobilized with respect to the camera incorporated into this optical system, the observation of the latter on the basis of the optical system 18 allows the central information processing unit 20 to determine the position of the observation frame labeled C18 associated with the optical system 18 with respect to the observation frame C16 of the optical reference system 16.

Specifically, in a manner analogous to the process described with regard to FIG. 4, knowing the relative positions of the visible frame of the target borne by the optical system 16 and of the observation frame associated with optical system 16 makes it possible to determine the relative positions of the observation frames C16 and C18.

Thus, by chaining, if an optical system is a so-called reference system, the entire installation is referenced.

After setting the vehicle 10 in place, the four optical systems can no longer observe one another. However, each of them is able to acquire an image of a wheel R of the vehicle.

As described in application WO-94/05969, each wheel is furnished with a target or pad 60 connected rigidly and in a known manner to the wheel. Each pad comprises a set of marks distributed in a known geometrical configuration stored in the information processing unit 20.

Before proceeding with the determination of the relative positions of the pads and hence those of the wheels, it is appropriate to take into account the warp of each pad and its off-centering so that the central information processing unit 20 takes this into account during the subsequent calculations. To this end, and in accordance with a process known per se, the unit 20 analyzes several images of each wheel acquired in separate determined positions.

On the basis of the simultaneous observation of each pad 60 from the four optical systems, the central information processing unit 20 determines the relative position of each wheel with respect to the observation frame of the associated camera as known per se. Specifically, with the center of the wheels being known, the horizontal planes being known and their cross section with the plane of the wheels being known and the vertical at the site being known, it is easy to retrieve the angles and the distances which are characteristic of the geometry of the vehicle.

Knowing the relative positions of the observation frames of the four optical systems, the central information processing unit 20 deduces the relative positions of the four wheels of the vehicle. It is thus possible to determine the geometry of the vehicle and to perform any adjustment procedure necessary for the satisfactory operation of the vehicle.

It is appreciated that with such an installation, the position of the four optical systems can be modified for each vehicle. Moreover, it is not necessary between each measurement procedure to maintain a fixed position between the optical systems. It is simply sufficient that between examining each vehicle, the unit 20 redetermines the relative positions of the observation frames associated with the various optical systems, in accordance with the process explained earlier. Thus, the installation is low in bulk and can be easily stored away when not in use.

Moreover, the installation and the process described herein can be generalized to any number of cameras referenced with respect to one another. Thus, it is possible to measure the vehicle in various attitudes and at different heights.

What is claimed is:

1. An optical installation for determining relative positions of at least two objects, said optical installation comprising:

at least two optical systems being moveable with respect to each other, each optical system of said at least two optical systems being associated with an observation frame and being adapted to determine a position of an object of the at least two objects with respect to its observation frame based on an image of the object captured by said optical system, wherein at least one optical system of said at least two optical systems is an optical reference system comprising a set of reference points of a known geometrical configuration, said set of reference points being secured to said optical reference system and immobilized in a known position with respect to the observation frame of said optical reference system, wherein said set of reference points is visible to at least one other optical system of said at least two optical systems in the absence of the at least two objects, wherein said at least one other optical system comprises:
means for analyzing an image of said set of reference points,
means for positioning said set of reference points with respect to the observation frame of said at least one other optical system, and
means for deducing a position of the observation frame of said at least one other optical system with respect to the observation frame of said optical reference system based on the position of said set of reference points with respect to the observation frame of said at least one other optical system and the known position of said set of reference points with respect to the reference frame of said optical reference system.

2. An optical installation according to claim 1, comprising a central information processing unit which includes said means for analyzing, said means for positioning and said means for deducing,
wherein said central information processing unit is connected to said at least two optical systems, and
wherein each of said at least two optical systems further comprises a video camera and a support for said video camera.

3. An optical installation according to claim 1, wherein said set of reference points comprises a group of coplanar discrete visible marks and at least one non-coplanar visible mark.

4. An optical installation according to claim 1, further comprising pads operable to be secured to the at least two objects at a known position, and wherein each optical system of said at least two optical systems comprises means for determining a position of a pad of said pads with respect to the observation frame of said optical system and means for deducing the position of the object with respect to the observation frame of said optical system from the determined position of said pad with respect to the observation frame of said optical system and from the known position of said pad with respect to the object.

5. An optical installation according to claim 2, wherein said set of reference points comprises a group of coplanar discrete visible marks and at least one non-coplanar visible mark.

6. An optical installation according to claim 2, further comprising pads operable to be secured to the at least two objects at a known position, and wherein each optical system of said at least two optical systems comprises means for determining a position of a pad of said pads with respect to the observation frame of said optical system and means for deducing the position of the object with respect to the observation frame of said optical system from the determined position of said pad with respect to the observation frame of said optical system and from the known position of said pad with respect to the object.

7. An optical installation according to claim 3, further comprising pads operable to be secured to the at least two objects at a known position, and wherein each optical system of said at least two optical systems comprises means for determining a position of a pad of said pads with respect to the observation frame of said optical system and means for deducing the position of the object with respect to the observation frame of said optical system from the determined position of said pad with respect to the observation frame of said optical system and from the known position of said pad with respect to the object.

8. An installation for determining relative positions of four objects, said installation comprising:
four optical systems to be disposed substantially at vertices of a quadrilateral in which the four objects are delimited within and said four optical systems being moveable with respect to each other, each optical system of said four optical systems being associated with an observation frame and being adapted to determine a position of an object of the four objects with respect to its observation frame based on an image of the object captured by said optical system, wherein two of said four optical systems are first and second optical reference systems, each optical reference system of said first and second optical reference systems comprising a set of reference points of a known geometrical configuration, said set of reference points being secured to said optical reference system and immobilized in a known position with respect to the observation frame of said optical reference system, wherein said set of reference points of said first optical reference system is visible from said second optical reference system in the absence of the four objects, wherein said second optical reference system comprises:
- means for analyzing an image of said set of reference points of said first optical reference system,
- means for positioning said set of reference points of said first optical reference system with respect to the observation frame of said second optical reference system,
- means for deducing a position of the observation frame of said second optical reference system with respect to the observation frame of said first optical reference system based on the position of said set of reference points of said first optical reference position with respect to the observation frame of said second optical reference system and the known position of said set of reference points of said first optical reference system with respect to the reference frame of said optical reference system, and
- means for deducing relative positions of the observation frames of each of said four optical systems.

9. An optical installation according to claim 8, comprising a central information processing unit which includes said means for analyzing, said means for positioning and each said means for deducing, wherein said central information processing unit is connected to said four optical systems, and wherein each of said four optical systems further comprises a video camera and a support for said video camera.

10. An optical installation according to claim 8, wherein said sets of reference points of said first and second optical reference systems each comprise a group of coplanar discrete visible marks and at least one non-coplanar visible mark.

11. An optical installation according to claim 8, further comprising pads operable to be secured to the four objects at a known position, and wherein each optical system of said four optical systems comprises means for determining a position of a pad of said pads with respect to the observation frame of said optical system and means for deducing the position of the object with respect to the observation frame of said optical system from the determined position of said pad with respect to the observation frame of said optical system and from the known position of said pad with respect to the object.

12. A method for determining relative positions of at least two objects by using at least two optical systems being moveable with respect to each other, each optical system of the at least two optical systems being associated with an observation frame, wherein at least one optical system of the at least two optical systems is an optical reference system comprising a set of reference points of a known geometrical configuration, the set of reference points being secured to the optical reference system and immobilized in a known position with respect to the observation frame of the optical reference system, wherein the set of reference points is visible to at least one other optical system of the at least two optical systems in the absence of the at least two objects, said method comprising:

- determining a position of each of the at least two objects with a respective one of the at least two optical systems with respect to the observation frame of the respective one of the at least two objects based on an image of each of the objects captured by the respective one of the at least two optical systems;
- analyzing an image of the set of reference points with the at least one other optical system;
- determining positioning of the set of reference points with respect to the observation frame of the at least one other optical system with the at least one other optical system; and
- deducing a position of the observation frame of the at least one other optical system with respect to the observation frame of the optical reference system based on the position of the set of reference points with respect to the observation frame of the at least one other optical system and the known position of the set of reference points with respect to the reference frame of the optical reference system with the at least one other optical system.

* * * * *